US012770818B2

(12) United States Patent
Cui et al.

(10) Patent No.: US 12,770,818 B2
(45) Date of Patent: Oct. 20, 2026

(54) CONNECTION DEVICE AND CORRESPONDING X-RAY SOURCE

(71) Applicant: NANOVISION TECHNOLOGY (BEIJING) CO., LTD, Beijing (CN)

(72) Inventors: Zhili Cui, Beijing (CN); Liang Cui, Beijing (CN); Zhichao Xue, Beijing (CN)

(73) Assignee: NANOVISION (NANJING) TECHNOLOGY GROUP CO., LTD., Nanjing (CN)

( * ) Notice: Subject to any disclaimer, the term of this patent is extended or adjusted under 35 U.S.C. 154(b) by 468 days.

(21) Appl. No.: 18/064,704

(22) Filed: Dec. 12, 2022

(65) Prior Publication Data

US 2023/0307203 A1 Sep. 28, 2023

Related U.S. Application Data

(63) Continuation-in-part of application No. PCT/CN2021/099341, filed on Jun. 10, 2021.

(30) Foreign Application Priority Data

Jun. 10, 2020 (CN) ......................... 202010525711.6
Jun. 10, 2020 (CN) ......................... 202021058175.5

(51) Int. Cl.
*H01J 35/16* (2006.01)
*H01J 35/02* (2006.01)
(Continued)

(52) U.S. Cl.
CPC .......... *H01J 35/165* (2013.01); *H01J 35/025* (2013.01); *H05G 1/04* (2013.01); *H05G 1/10* (2013.01)

(58) Field of Classification Search
CPC ........ H01J 35/165; H01J 35/025; H05G 1/04; H05G 1/10; H01R 13/5216; H01R 2101/00; H01R 13/533; H01R 13/53
See application file for complete search history.

(56) References Cited

U.S. PATENT DOCUMENTS

2010/0310053 A1* 12/2010 Yamamoto .............. H05G 1/06 378/200
2016/0365218 A1* 12/2016 Takahashi .............. H01J 19/60

FOREIGN PATENT DOCUMENTS

CN 104012182 A * 8/2014
CN 104183413 A * 12/2014 ............. H01R 43/18
(Continued)

*Primary Examiner* — Uzma Alam
*Assistant Examiner* — Richard O Toohey
(74) *Attorney, Agent, or Firm* — George Guosheng Wang; Upstream Research and Patent LLC

(57) ABSTRACT

The present invention relates to a connection device of a high-voltage power supply and an X-ray tube, and a corresponding X-ray source. The connection device comprises a first connecting unit a second connecting unit, the first connecting unit is mounted on a high-voltage power supply and connects a high-voltage power output terminal of the high-voltage power supply, and the second connecting unit is mounted on an X-ray tube and connects a cathode of the X-ray tube. By mounting the first connecting unit and the second connecting unit on the high-voltage power supply and the X-ray tube, and detachably plugging said units together, the high-voltage power supply and the X-ray tube can be connected together. Moreover, the high-voltage power supply and the X-ray tube can be separated so that disassembly for repair can be carried out when any one of the high-voltage power supply and the X-ray tube is faulty.

5 Claims, 6 Drawing Sheets

(51) Int. Cl.
*H05G 1/04* (2006.01)
*H05G 1/10* (2006.01)

(56) References Cited

FOREIGN PATENT DOCUMENTS

| | | | | | |
|---|---|---|---|---|---|
| CN | 105122950 | A | * | 12/2015 | ............... H05G 1/10 |
| EP | 3454356 | A2 | * | 3/2019 | ........... G01N 23/043 |
| JP | 2008293868 | A | * | 12/2008 | |
| WO | WO 2016009633 | A1 | * | 1/2016 | ............ G01N 23/04 |

* cited by examiner

CONNECTION DEVICE AND CORRESPONDING X-RAY SOURCE

BACKGROUND

Technical Field

The invention relates to a connection device of a high-voltage power supply and an X-ray tube, and also relates to a corresponding X-ray source containing the connection device, belonging to the field of radiation imaging technology.

Related Art

The X-ray tube is a vacuum diode working under high voltage. It contains two electrodes: one is a cathode, which is a filament for emitting electrons, and the other is an anode, which is a target for receiving electron bombardment. Both electrodes are sealed in a high vacuum glass or ceramic shell. The X-ray tubes are used in medical diagnosis and treatments, and in industrial technology like nondestructive testing, structural analysis, spectral analysis and negative film exposure of materials.

At present, the high-voltage power supply and the X-ray tube is connected in two main modes: an integral mode and an independent mode. The high-voltage power supply and X-ray tube of the integral mode is an overall structure by encapsulating the X-ray tube in the high-voltage power supply, which are mainly suitable for low-power and small volume applications. In addition, when either of the X-ray tube or the high-voltage power supply fails, it is difficult to repair and disassemble, so the high-voltage power supply and the X-ray tube should be replaced as a whole. The high-voltage power supply and the X-ray tube of the independent mode require high-voltage socket and high-voltage plug to connect the high-voltage power supply and the X-ray tube together, which is mainly suitable for high-power and large volume application scenario. In addition, the total volume and weight of high-voltage power supply and the X-ray tube of the independent mode are relatively large.

SUMMARY

The primary technical problem to be solved by the present invention is to provide a connection device of a high-voltage power supply and an X-ray tube.

Another technical problem to be solved by the present invention is to provide a X-ray source including the connection device of a high-voltage power supply and an X-ray tube.

To achieve the foregoing purpose, the following technical solutions are used in the present invention:

According to a first aspect of an embodiment of the present invention, there is provided a connection device of a high-voltage power supply and an X-ray tube, comprising a first connection unit and a second connection unit, the first connection unit for connecting a high-voltage power output terminal of the high-voltage power supply and the second connection unit for connecting the cathode of the X-ray tube;

the first connection unit comprising a first housing, one end of the first housing being provided with the high-voltage power output terminal, the other end of the first housing being mated to the outer side of the first fixing member of the high-voltage power housing;

the second connection unit comprising a second housing, one end of the second housing being provided with a power input terminal, the other end of the second housing being fixed to a second fixing member of the X-ray tube housing;

the space between the first housing and the high-voltage power supply housing, and the space between the second housing and the X-ray tube insert are filled with an insulating filler;

the first connection unit and the second connection unit are removably plugged together so that the high voltage power supply and the X-ray tube are removably connected together.

Preferably, the X-ray tube is placed in an internal cavity of the second connection unit.

Preferably, the first connection unit comprises a third fixing member embedded in the high-voltage power supply housing, and the third fixing member is provided with a plurality of high-voltage power output terminals;

the third fixing member is embedded in the high-voltage power supply housing, a first insulating filler is filled among the third fixing member, a first fixing member of the high-voltage power supply housing and the high-voltage power supply housing; and an outer end surface of the first insulating filler flushes with the outer end surface of the first fixing member.

Preferably, the second connection unit comprises a fourth fixing member embedded in the X-ray source housing, and the fourth fixing member is provided with a plurality of power input terminals;

the fourth fixing member embedded in the X-ray source housing, a second insulating filler fills among the fourth fixing member, the second fixing member of the X-ray source housing and the X-ray source housing, and an outer end surface of the second insulating filler flushes with an outer end surface of the second fixing member of the X-ray source housing.

Preferably, the first connection unit comprises a third fixing member embedded in the high-voltage power supply housing, and the third fixing member is provided with a plurality of high-voltage power output terminals;

the third fixing member is embedded in the high-voltage power supply housing, a first insulating filler fills among the third fixing member, a first fixing member of the high-voltage power supply housing and the high-voltage power supply housing;

an outer end surface of the first insulating filler extends a preset distance outwardly from an end surface of the first fixing member.

Preferably, the second connection unit comprises a fourth fixing member embedded in the X-ray source housing, and the fourth fixing member is provided with a plurality of power input terminals;

the fourth fixing member is embedded in the X-ray source housing, a second insulating filler fills among the fourth fixing member, the second fixing member of the X-ray source housing and the X-ray source housing, and an outer end surface of the second insulating filler extends inside the second fixing member of the X-ray source housing, and extend a preset distance from an outer end surface of the second fixing member.

Preferably, the first connection unit comprises a third fixing member embedded in the high-voltage power supply housing, and the third fixing member is provided with a plurality of high-voltage power output terminals;

the third fixing member is embedded in the high-voltage power supply housing, a first insulating filler fills among the third fixing member, the first fixing member of the high-voltage power supply housing and the high-voltage power supply housing;

the outer end surface of the first insulating filler extends inside an end surface of the first fixing member;

the outer end surface of the first insulating filler extends a preset distance from the outer end surface of the first fixing member.

Preferably, the second connection unit comprises a fourth fixing member embedded in the X-ray source housing, and the fourth fixing member is provided with a plurality of power input terminals;

the fourth fixing member is embedded in the X-ray source housing, a second insulating filler fills among the fourth fixing member, the second fixing member of the X-ray source housing and the X-ray source housing, and an outer end surface of the second insulating filler extends a preset distance outwardly from an end surface of the second fixing member.

Preferably, a first shielding ring surrounds the high-voltage power output terminals; and a second shielding ring surrounds the power input terminals.

Preferably, end surfaces of the high-voltage power output terminals extend outside from an outer end surface of the first insulating filler, end surfaces of the power input terminals are embedded in the second insulating filler and flush with an outer end surface of the second insulating filler.

Preferably, end surfaces of the high-voltage power output terminals are embedded in the first insulating filler, the end surfaces of the power input terminals extends outside from the outer end surface of the second insulating filler.

According to a second aspect of an embodiment of the present invention, there is provided an X-ray source comprising a high-voltage power supply and an X-ray tube, the high-voltage power supply and the X-ray tube being detachably connected together by the connection device.

The connection device of high-voltage power supply and X-ray tube provided by the present invention, by mounting the first connection unit and the second connection unit correspondingly to the high-voltage power supply and X-ray tube respectively, removably plugged together, can not only make the high-voltage power supply and X-ray tube connected together to realize the high-voltage power supply providing high-voltage to the X-ray tube; but also separate the high-voltage power supply and X-ray tube to realize the disassembly and maintenance when either of the high-voltage power supply and X-ray tube fails.

DETAILED DESCRIPTION

Technical contents of the present invention are further described in detail below with reference to the accompanying drawings and specific embodiments.

Figure 1:
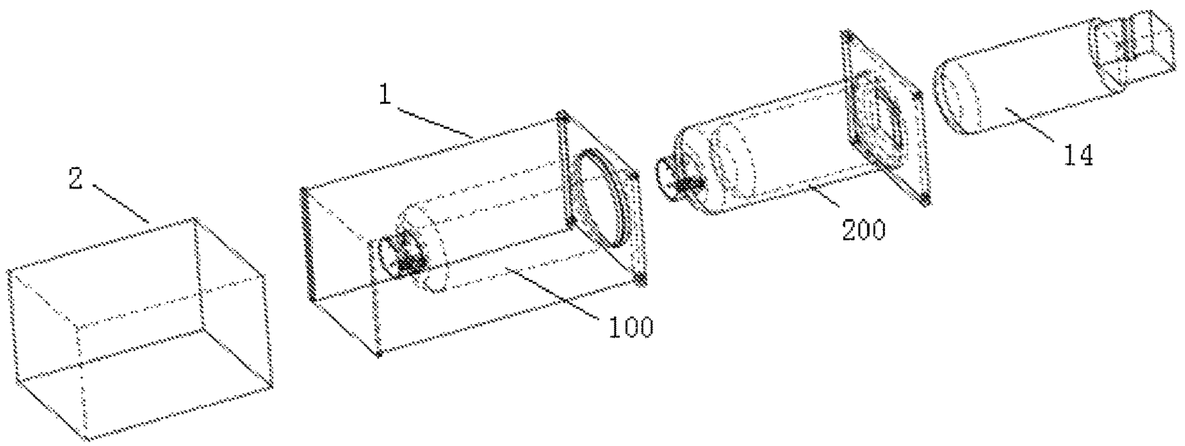
FIG. 1 is an exploded schematic structural diagram of a connection device of a high-voltage power supply and an X-ray tube according to embodiment 1 of the present invention.
Figure 2:
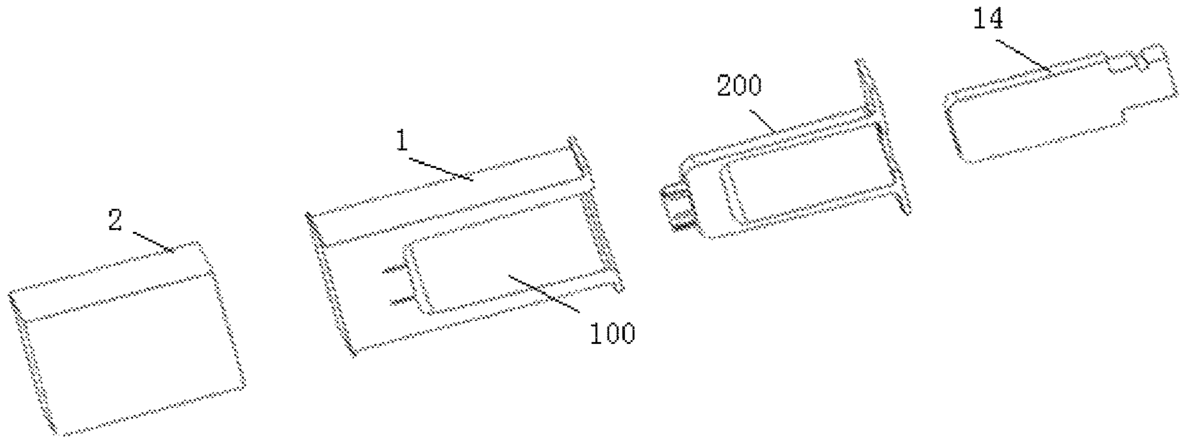
FIG. 2 is a sectional diagram of the connection device of the high-voltage power supply and the X-ray tube according to embodiment 1 of the present invention.

As shown in FIG. 1 and FIG. 2, an embodiment of the present invention provides a connection device of an X-ray tube for connecting a high-voltage power supply and an X-ray tube. The connection device of an X-ray tube includes a first connection unit 100 and a second connection unit 200. The first connection unit 100 is configured to connect a high-voltage power output terminal, and the second connection unit 200 is configured to connect a cathode of the X-ray tube. The first connection unit 100 and the second connection unit 200 can be detachably plugged together, with enough silica gel therebetween to extrude air, so that the high-voltage power supply and the X-ray tube can connect together under the sealed condition.

Specifically, the first connection unit 100 can be embedded in the high-voltage power supply output terminal, or be fixed outside the high-voltage power supply output terminal with a first fixing member (not showing). The second connection unit 200 is configured to match with the first connection unit 100, so as to be plugged into the first connection unit 100.

The structure of the first connection unit 100 and the second connection unit 200 will be described in detail through specific embodiments below.

Embodiment 1

Figure 3:
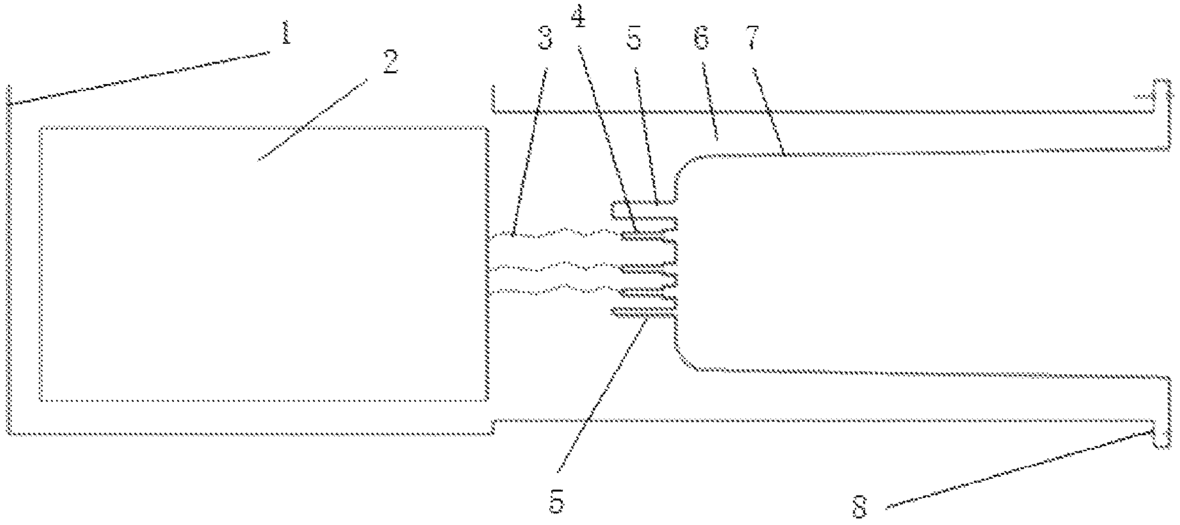
FIG. 3 is a structural diagram of the first connection unit in the connection device of the high-voltage power supply and the X-ray tube according to embodiment 1 of the present invention.

As shown in FIGS. 1 to 3, the first connection unit 100 provided by this embodiment is used to be embedded in a high-voltage power supply housing 1. The first connection unit 100 includes a first housing 7 for being embedded in the high-voltage power supply housing 1. The first housing 7 has a plurality of high-voltage power output terminals 4 at one end thereof (function as a socket), and an end surface at the other end thereof. The end surface of the first housing 7 is coplanar with an end surface of the first fixing member 8 of the high-voltage power supply housing 1. The end surface of the first housing 7 is fixed with the first fixing member 8. The first housing 7 is made of non-metallic material.

As shown in FIG. 2 and FIG. 3, in the present embodiment, in order to ensure the uniformity of the local electric field, the first housing 7 is provided with a first shielding ring 5 around the high-voltage power output terminals 4. The first shielding ring 5 is a metal shielding ring with a guiding member.

As shown in FIG. 3, the high-voltage power output terminals 4 can be connected to a high-voltage power module 2 of the high-voltage power supply directly (or through cable 3) for outputting preset high voltage. Depending on application, the high-voltage power output terminals 4 and the high-voltage module 2 is selected to be direct connected or be connected by the cable.

Among them, the length of the first housing 7 needs to meet the requirements of a creepage distance. That is, along a length direction of the first housing 7, the distance between the end surfaces of the high-voltage power output terminals 4 and the end surface of the first fixing member 8 of the high-voltage power supply housing 1 meets the requirements of the creepage distance.

In addition, the length of the first housing 7 is adjusted according to the high voltage output by the high-voltage module 2. In principle, a length of 1 mm of the first housing 7 is required by 1 kV high voltage. The length of the first housing 7 is thus determined. For example, when the high-voltage module 2 needs to output 5 kV, the length of the first housing 7 should be set to 5 mm.

Wherein, the first fixing part 8 is provided with a through hole communicated with the end surface of the first housing 7. The shape and size of the through hole are the same as the end surface of the first housing 7, so that the first housing 7 can be embedded in the high-voltage power supply housing 1 from the through hole. On condition of the first connection unit 100 embedded in the high-voltage power supply housing 1, high-voltage insulation treatment is applied between the first housing 7 and the high-voltage power supply housing 1, such as filling with insulation fillers like high-voltage oil or high-voltage insulation glue (illustrated as an insulation filler 6 shown in FIG. 3).

It should be noted that, during actual production, the first housing 7, the first fixing member 8 and the high-voltage power supply housing 1 can be integral. Alternatively, the one end of the first housing 7 with high-voltage power output terminals 4 and the first shielding ring 5, is embedded in the high-voltage power supply housing 1 through the through hole of the first fixing member 8, the end surface of the first housing 7 is fixed to the first fixing member 8 with seamless connection.

Figure 4:
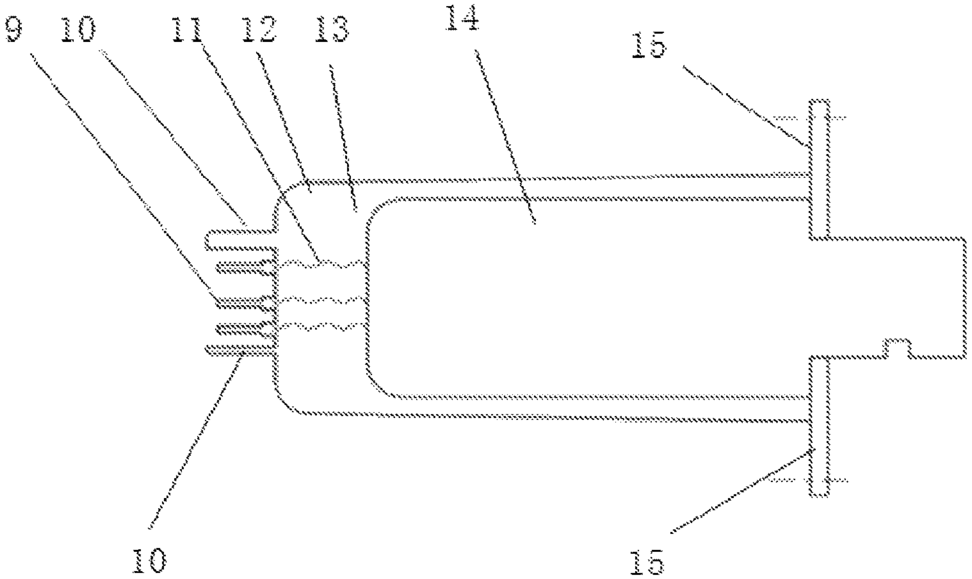
FIG. 4 is a structural diagram of the second connection unit in the connection device of the high-voltage power supply and the X-ray tube according to embodiment 1 of the present invention.
Figure 5:
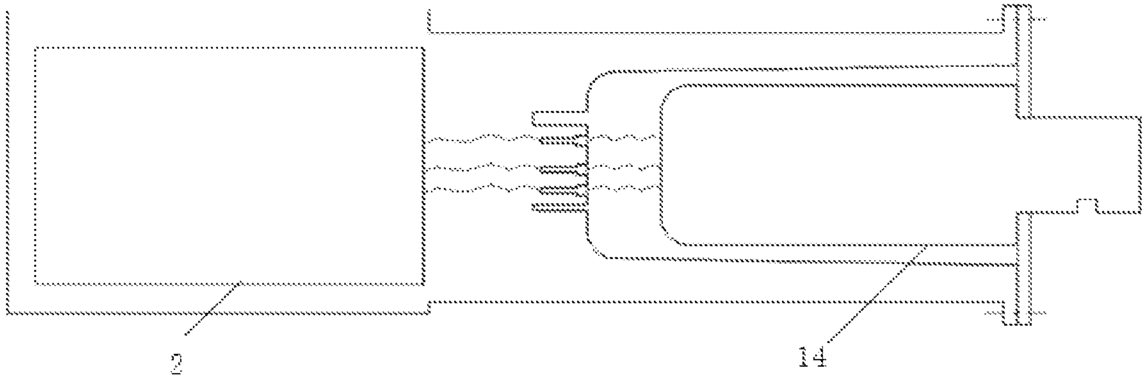
FIG. 5 is a schematic diagram of the first connection unit connected with the second connection unit in the connection device of the high-voltage power supply and the X-ray tube according to embodiment 1 of the present invention.

As shown in FIG. 1, FIG. 2 and FIG. 4, the second connection unit 200 is connected with a second fixing member 15 of the X-ray tube. Specifically, the second connection unit 200 includes a second housing 12, a plurality of power input terminals 9 (function as a plug) and a second shielding ring 10. The power input terminals 9 and the second shielding ring 10 are provided at one end of the second housing 12, and the other end of the second housing 12 is fixed with a second fixing member 15 of the X-ray tube. The second housing 12 is made of non-metallic material. Moreover, the shape and size of the second housing 12 match with that of the first housing 7; the shape and size of the power input terminals 9 match with the high-voltage power output terminals 4; and the shape and size of the second shielding ring 10 match with that of the first shielding ring 5. As shown in FIG. 5, the second housing 12 and the power input terminals 9 are detachably plugged with the first housing 7 and the high voltage output terminals 4 respectively.

As shown in FIG. 1 and FIG. 4, in this embodiment, in order to ensure the uniformity of the local electric field, the second shielding ring 10 surrounds the power input terminals 9. The second shielding ring 10 is a metal shielding ring with a guiding member.

As shown in FIG. 4, the power input terminals 9 connect a cathode of the X-ray tube insert 14 through a cable 11. The power input terminals 9 function as a power input of the X-ray tube to receive the high voltage. Depending on needs, the power input terminals 9 could connect the X-ray tube insert 14 by a cable or connect directly.

As shown in FIG. 1 and FIG. 4, the second fixing member 15 is provided with a passage for accommodating an anode of the X-ray tube insert 14. The shape and size of the passage are the same as those of the anode of the X-ray tube insert 14, so that the anode of the X-ray tube insert 14 can be fixed in the second fixing member 15 by seamless connection under condition that the X-ray tube insert 14 is inserted the passage. under condition that the X-ray tube insert 14 is inserted the passage, the power input terminals 9 connect the cathode of the X-ray tube insert 14, and the second housing 12 surrounds the X-ray tube insert 14 and attaches the second fixing member 15 in seamless connection. Insulating fillers, such as high-voltage oil or high-voltage insulating glue (illustrated by the insulating filler 13 shown in FIG. 4), are filled between the second housing 12 and the X-ray tube insert 14 by high-voltage insulation treatment.

As can be seen from the above description, the second connection unit 200 is not a solid structure, so its internal cavity can be used as a space for the X-ray tube. In actual processing, the second housing 12, the X-ray tube core 14 and the second fixing member 15 can be processed into one piece by using one-piece molding technology according to the actual needs of users.

Similarly, depending on needs, the second housing, the second fixing member 15 and the X-ray tube are one-piece or individual pieces. The other end of the second housing with the high-voltage power output terminals and the second shielding ring, is embedded into the X-ray tube from the passage of the second fixing member, and the end surface of the second housing and the second fixing member attached together by seamless connection.

In this embodiment, to provide high voltage for the X-ray tube through the high-voltage power supply, it is needed to coat the second connection unit 200 with enough silica gel and then insert the second connection unit 200 to the first connection unit 100, and then fasten the first fixing member 8 and the second fixing member 15 together by bolts or the like to extrude air therebetween. Since the second connection unit 200 is amounted in the X-ray tube and the first connection unit 100 is amounted in the high-voltage power supply, the high-voltage power supply is fixed with the X-ray tube while preventing unexpected discharge of the high-voltage power supply. When the high-voltage power supply or the X-ray tube fails to work, it is needed to remove the bolts on the first fixing member 8 and the second fixing member 15, pull the second connection unit 200 out of the first connection unit 100 to realize separation of the high-voltage power supply and the X-ray tube, so as to facilitate the fault detection and maintenance of the high-voltage power supply or the X-ray tube respectively. Therefore, the high-voltage power supply and the X-ray tube are connected together in the aforementioned way, which not only reduces the installation space of the high-voltage power supply and the X-ray tube, but also facilitates the disassembly and maintenance when either of the high-voltage power supply and the X-ray tube fails.

Embodiment 2

Figure 6:
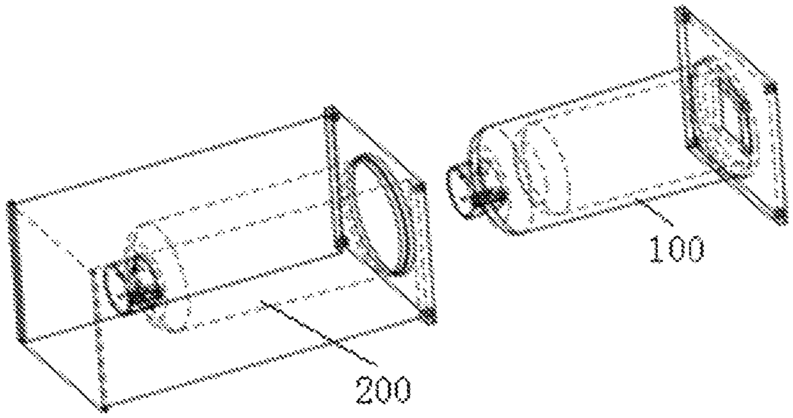
FIG. 6 is an exploded schematic diagram of the decomposition of the first connection unit and the second connection unit in embodiment 2 of the present invention.

As shown in FIG. 6, the first connection unit 100 and the second connection unit 200 provided by the present embodiment is different from those of embodiment 1 that the first connection unit 100 is installed with the high-voltage power supply, the second connection unit 200 is installed with the X-ray tube. Thus, the connection of the high-voltage power supply and the X-ray tube is realized by plugging the first connection unit 100 and the second connection unit 200, and separation of the high-voltage power supply and the X-ray tube is realized by unplugging the first connection unit 100 from the second connection unit 200. That is, the connection mode of the first connection unit 100 and the second connection unit 200 provided by embodiment 2 is different from that of embodiment 1.

Therefore, as shown in FIG. 1 to FIG. 6, the first connection unit 100 in embodiment 2 is similar to that of the second connection unit 200 in embodiment 1, and is connected with the first fixing member of the high-voltage power supply housing. The second connection unit 200 in embodiment 2 is similar to the first connection unit 100 in embodiment 1, and is embedded in the X-ray tube. Specifically, in the first connection unit 100 of the present embodiment, a plurality of high-voltage power output terminals (function as a plug) is provided at one end of the first housing, and an end surface at the other end of the first housing surrounds a first fixing member of the high-voltage power supply housing.

In this embodiment, in order to ensure the uniformity of the local electric field, a first shielding ring surrounds the high-voltage power output terminals.

The first fixing member is provided with a through hole communicated with the end surface of the first housing, through which the high-voltage power output terminals can connect the high-voltage module of the high-voltage power supply directly or with a cable. The high-voltage power supply housing, the first housing and the first fixing member are seamless connected, high-voltage oil or high-voltage insulation adhesive are filled between the high-voltage power supply housing and the first housing by high-voltage insulation treatment. Alternatively, depending on needs, the first housing, the high-voltage power supply housing and the first fixing member could be one-piece (integral).

In the second connection unit provided in the present embodiment, a plurality of power input terminals (function as a socket) are provided at one end of the second housing, and an end surface at the other end of the second housing is flush with the second fixing member of the X-ray tube housing and is fastened with the second fixing member. The second fixing member is provided with a passage communicated with the end surface the second housing. The shape and size of the passage are the same as the end surface of the second housing, so as to allow the second housing insert the X-ray tube and allow the high-voltage insulation treatment (filling with high-voltage oil, high-voltage insulation adhesive, or the like) between the second housing and the X-ray tube. In addition, the power input terminals and the cathode of the X-ray tube insert connect in the same way as in embodiment 1, which is redundant to be specified here.

In this embodiment, in order to ensure the uniformity of the local electric field, a second shielding ring surrounds the high-voltage power output terminals.

Similarly, in actual processing, the second housing, the second fixing member and the X-ray tube housing can be processed into one piece using one-piece molding technology according to the actual needs of users; after the end of the second housing set with power input terminal and the second shielding ring is embedded into the X-ray tube housing through the through hole of the second fixing member, the port of the other end of the second housing and the second fixing member can be fixed together in a seamless connection.

In this embodiment, to provide high voltage for the X-ray tube through the high-voltage power supply, it is needed to coat the first connection unit 100 and the second connection unit 200 with enough silica gel and then insert the first connection unit 100 to the second connection unit 200, and then fasten the first fixing member and the second fixing member together by bolts or the like to extrude air therebetween. Since the second connection unit 200 is amounted in the X-ray tube and the first connection unit 100 is amounted in the high-voltage power supply, the high-voltage power supply is fixed with the X-ray tube while preventing unexpected discharge of the high-voltage power supply. When the high-voltage power supply or the X-ray tube fails to work, it is needed to remove the bolts on the first fixing member and the second fixing member, pull the second connection unit 200 out of the first connection unit 100 to realize separation of the high-voltage power supply and the X-ray tube, so as to facilitate the fault detection and maintenance of the high-voltage power supply or the X-ray tube respectively. Therefore, the high-voltage power supply and the X-ray tube are connected together in the aforementioned way, which not only reduces the installation space of the high-voltage power supply and the X-ray tube, but also facilitates the disassembly and maintenance when either of the high-voltage power supply and the X-ray tube fails.

Embodiment 3

Figure 7:
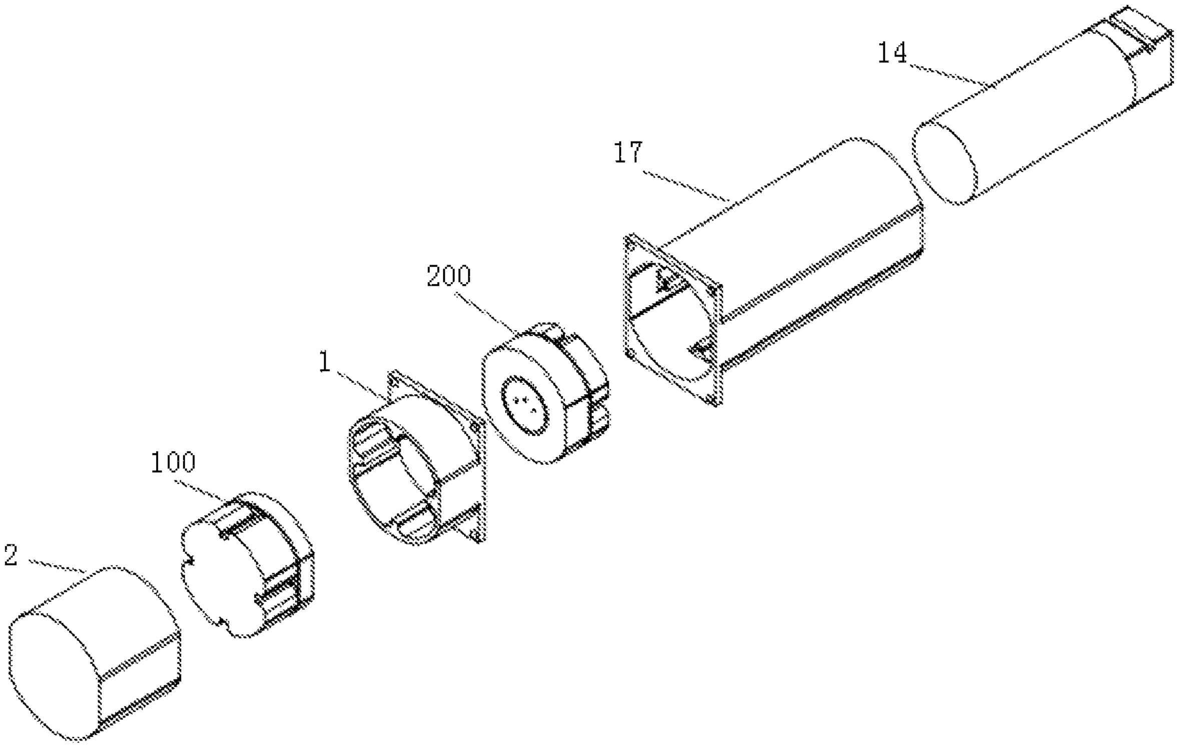
FIG. 7 is an exploded schematic diagram of the connection device of the high-voltage power supply and the X-ray tube according to embodiment 3 of the present invention.
Figure 8:
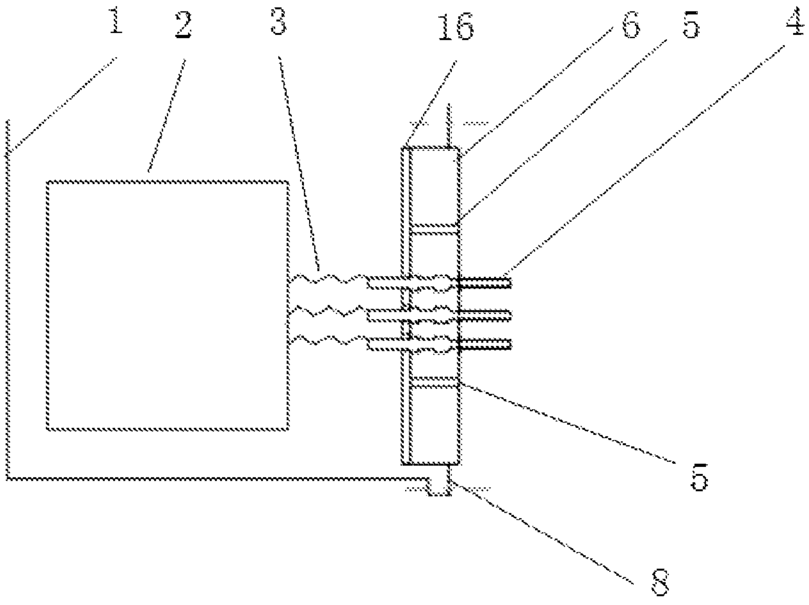
FIG. 8 is a structural diagram of the first connection unit in the connection device of the high-voltage power supply and the X-ray tube according to embodiment 3 of the present invention.

As shown in FIG. 7 and FIG. 8, the first connection unit 100 provided in the present embodiment is embedded in the high-voltage power supply housing 1. The first connection unit 100 comprises a third fixing member 16 embedded in the high-voltage power supply housing 1. The third fixing member 16 includes a plurality of high-voltage power output terminals 4 (function as a plug). On condition that the third fixing member 16 is embedded in the high-voltage power supply housing 1, insulating fillers such as high-voltage oil or high-voltage insulating glue (illustrated by the insulating filler 6 shown in FIG. 8) are filled among the third fixing member 16, the first fixing member 8 and the high-voltage power supply housing 1. Outer end face of the insulating filler 6 is selectively to be flush with outer end surface of the first fixing member 8 of the high-voltage power supply housing 1, extend beyond a preset distance outwardly from the outer surface of the first fixing member 8, or extend a preset distance inwardly from the outer end face of the first fixing member 8. In addition, between the high-voltage module 2 and the high-voltage power supply housing 1 is filled with insulation fillers such as high-voltage oil or high-voltage insulation glue.

As shown in FIG. 8, in the present embodiment, in order to ensure the uniformity of the local electric field, a first shielding ring 5 surrounds the high-voltage power output terminals 4. The first shielding ring 5 is a metal shielding ring with a guide member. The outer surface of the first shielding ring 5 is flush with the outer end surface of the insulating filler 6 that is filled among the third fixing member 16, the first fixing member 8 and the high-voltage power supply housing 1.

As shown in FIG. 8, the high-voltage power output terminals 4 connect the high-voltage module 2 of the high-voltage power supply through the cable 3 or connect directly. The high-voltage power output terminals 4 function as an output terminal of the high-voltage power supply for outputting the preset high voltage. Specifically, one end of the high-voltage power output terminals 4 connect the high-voltage module 2 of the high-voltage power supply through the cable 3 or connect directly, and the other ends of the high-voltage power output terminals 4 protrude from the filled insulating filler 6 from the high-voltage power supply housing 1, so as to detachably connect the second connection unit 200.

Figure 9:
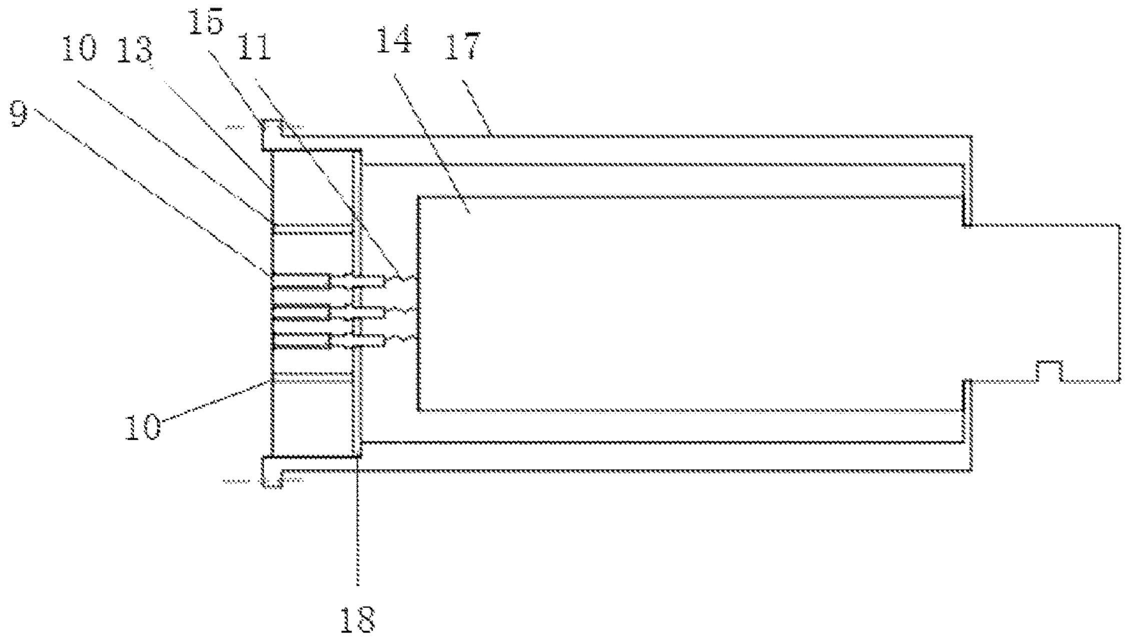
FIG. 9 is a structural diagram of the second connection unit in the connection device of the high-voltage power supply and the X-ray tube according to embodiment 3 of the present invention.

As shown in FIG. 7 and FIG. 9, the second connection unit 200 is embedded in a X-ray source housing 17. The second connection unit 200 comprises a fourth fixing member 18 that is embedded in the X-ray source housing 17. The fourth fixing member 18 has a plurality of power input terminals 9 (function as a socket). The fourth fixing member 18 is embedded in the X-ray source housing 17, and insulating filler, such as high-voltage oil or high-voltage insulating glue (illustrated as the insulating filler 13 shown in FIG. 9) fills among the fourth fixing member 18, the second fixing member 15 and the X-ray source housing 17. The outer surface of the insulating filler 6 filled among the third fixing member 16, the first fixing member 8 and the high-voltage power supply housing 1 flushes with the outer end surface of the first fixing member 8, and the outer surface of the insulating filler 13 filled among the fourth fixing member 18, the second fixing member 15 and the X-ray source housing 17 flushes with the outer end surface of the second fixing member 15, so as to ensure that the first connection unit 100 and the second connection unit 200 can reliably plugged together after the high-voltage power output terminals 4 are inserted into the power input terminals 9.

Figure 10:
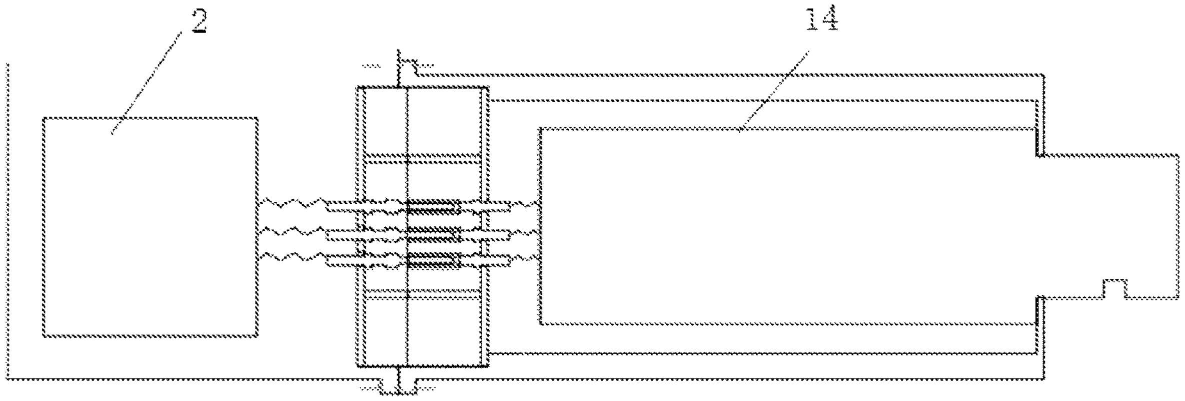
FIG. 10 is a schematic diagram of the first connection unit connected with the second connection unit in the connection device of the high-voltage power supply and the X-ray tube according to embodiment 3 of the present invention.

Alternatively, the outer surface of the insulating filler 6 filled among the third fixing member 16, the first fixing member 8 and the high-voltage power supply housing 1 extends a preset distance outwardly from the first fixing member 8, the outer surface of the insulating filler 13 filled among the forth fixing member 18, the second fixing member 15 and the X-ray source housing 17 extends inwardly for a preset distance from the outer surface of the second fixing member 15, which equals to the preset distance between the outer surface of the insulating filler 6 and the first fixing member 8, so as to ensure that the first connection unit 100 and the second connection unit 200 are plugged together after the high-voltage power output terminals are inserted into the power input terminals 9 (as shown in FIG. 10).

Alternatively, the outer surface of the insulating filler 6 filled among the third fixing member 16, the first fixing member 8 and the high-voltage power supply housing 1 extend inwardly from the first fixing member 8 of the high-voltage power supply housing 1, the outer surface of the insulating filler 13 filled among the fourth fixing member 18, the second fixing member 15 and the X-ray source housing 17 extends a preset distance outwardly from the outer surface of the second fixing member 15. which equals to the preset distance between the outer surface of the insulating filler 6 and the outer surface of the first fixing member 8, so as to ensure that the first connection unit 100 and the second connection unit 200 are plugged together after the high-voltage power output terminals 4 are inserted into the power input terminals 9.

As shown in FIG. 9, in the present embodiment, in order to ensure the uniformity of the local electric field, a second shielding ring 10 surrounds the power input terminals 9. The second shielding ring 10 is a metal shielding ring with a guide member. The outer surface of the second shielding ring 10 flushes with the outer end surface of the insulating filler 13 among the fourth fixing member 18, the second fixing member 15 and the X-ray source housing 17.

As shown in FIG. 9, the power input terminals 9 connect the cathode of the X-ray tube insert 14 through the cable 11 or directly connect. The power input terminals 9 function as the power input of the X-ray tube to receive the required high voltage. Specifically, one end of the power input terminal 9 connect the cathode of the X-ray tube insert 14 through the cable 11, the other ends of the power input terminals 9 are embedded in the filled insulating filler with the outer end surfaces of the power input terminals 9 being flush with the outer end surface of the second shielding ring 10, so that the first connection unit 100 and the second connection unit 200 are plugged together after the high-voltage power output terminals 4 are inserted into the power input terminals 9.

In the present embodiment, as shown in FIG. 9, to provide high voltage for the X-ray tube through the high-voltage power supply, it is needed to coat the first connection unit 100 and the second connection unit 200 with enough silica gel and then insert the first connection unit 100 to the second connection unit 200, and then fasten the first fixing member and the second fixing member together by bolts or the like to extrude air therebetween. Since the second connection unit 200 is amounted in the X-ray tube and the first connection unit 100 is amounted in the high-voltage power supply, the high-voltage power supply is fixed with the X-ray tube while preventing unexpected discharge of the high-voltage power supply. When the high-voltage power supply or the X-ray tube fails to work, it is needed to remove the bolts on the first fixing member and the second fixing member, pull the second connection unit 200 out of the first connection unit 100 to realize separation of the high-voltage power supply and the X-ray tube, so as to facilitate the fault detection and maintenance of the high-voltage power supply or the X-ray tube respectively. Therefore, the high-voltage power supply and the X-ray tube are connected together in the aforementioned way, which not only reduces the installation space of the high-voltage power supply and the X-ray tube, but also facilitates the disassembly and maintenance when either of the high-voltage power supply and the X-ray tube fails.

Embodiment 4

Figure 11:
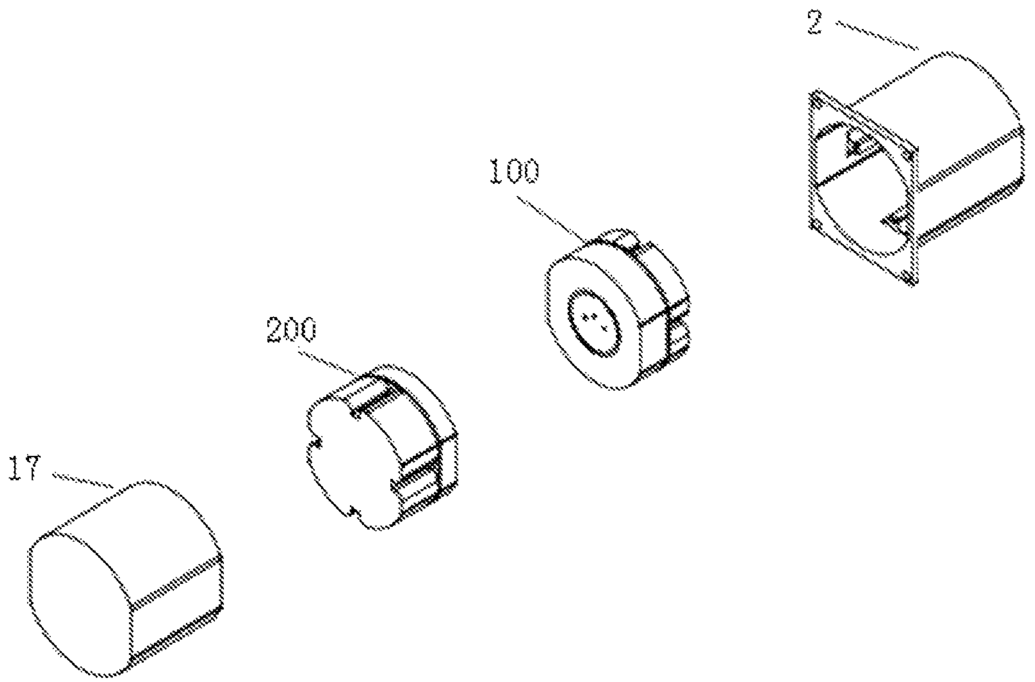
FIG. 11 is a schematic diagram of the decomposition of the first connection unit and the second connection unit in embodiment 4 of the present invention.

As shown in FIG. 11, the first connection unit 100 and the second connection unit 200 in the present embodiment differ from those in the embodiment 3 in that, the second connection unit 200 amounted in the X-ray tube is plugged into the first connection unit 100 amounted in the high-voltage power supply to connect the high-voltage power supply and the X-ray tube, and the second connection unit 200 is unplugged from the first connection unit 100 to separate the high-voltage power supply from the X-ray tube. That is, the connection mode of the first connection unit 100 and the second connection unit 200 in the present embodiment 4 is different from that of the embodiment 3.

Specifically, the first connection unit 100 provided by the present embodiment is different from that in embodiment 3 in that, one ends of each high-voltage power output terminals 4 connect the high-voltage module 2 of the high-voltage power supply through cable 3 or connect directly, and the other ends of the high-voltage power output terminals 4 are embedded in the filled insulating filler and flush with the outer end surface of the insulating filler. This structure is similar to the structure of the power input terminals 9 of the second connection unit 200 provided by embodiment 3 shown in FIG. 9.

The third fixing member 16 is embedded in the high-voltage power supply housing 1, and insulation filler such as high-voltage oil or high-voltage insulation glue is filled among the third fixing member 16, the first fixing member 8 and the high-voltage power supply housing 1. The outer end surface of the filled insulating filler 6 flushes with the outer end surface of the first fixing member 8. Alternatively, the outer end surface of the filled insulating filler 6 extends a preset distance outwardly from the end surface of the first fixing member 8. Alternatively, the outer end surface of the filled insulating filler 6 extend a preset distance inwardly from the outer end surface of the first fixing member 8.

The second connection unit 200 of the present embodiment differs from that in the embodiment 3 that one end of the power input terminals 9 connect the cathode of the X-ray tube insert 14 through the cable 11 or connect directly; and the other end of the power input terminal 9 protrude outside from the filled insulating filler. This structure is similar to the structure of the high-voltage power output terminals 4 of the first connection unit 100 provided by the embodiment 3 as shown in FIG. 8. Furthermore, the fourth fixing member 18 is embedded in the X-ray source housing 17, the outer end surface of the insulating filler 6 filled among the third fixing member 16, the first fixing member 8 and the high-voltage power supply housing 1 flushes with the outer end surface of the first fixing member 8, and the outer end surface of the insulating filler 13 filled among the fourth fixing member 18, the second fixing member 15 and the X-ray source housing 17 flushes with the outer end surface of the second fixing member 15 of the X-ray source housing 17 to ensure that the end surfaces of the first connection unit 100 and the second connection unit 200 abut against each other after the power input terminals 9 are inserted into the high-voltage power output terminals 4.

Alternatively, the outer end surface of the insulating filler 6 filled among the third fixing member 16, the first fixing member 8 and the high-voltage power supply housing 1 extends a preset distance outwardly from the end surface of the first fixing member 8, the outer end surface of the insulating filler 13 filled among the fourth fixing member 18, the second fixing member 15 and the X-ray source housing 17 extend inwardly from the outer end surface of the second fixing member 15 of the X-ray source housing 17. The preset distance between The outer end surface of the insulating filler 13 and the outer end surface of the second fixing member 15 equals to the preset distance from the outer end surface of the insulating filler 6 protruding outwardly from the outer end surface of the first fixing member 8, to ensure that the end surfaces of the first connection unit 100 and the second connection unit 200 abut against each other after the power input terminals 9 are inserted into the high-voltage power output terminals 4.

Alternatively, the outer end surface of the insulating filler 6 filled among the third fixing member 16, the first fixing member 8 and the high-voltage power supply housing 1 extend inwardly from the end surface of the first fixing member 8, the outer end surface of the insulating filler 13 filled among the fourth fixing member 18, the second fixing member 15 and the X-ray source housing 17 extends a preset distance outwardly from the end surface of the second fixing member 15, which equals to the preset distance between the outer end surface of the insulating filler 6 and the outer end surface of the first fixing member 8, to ensure that the end surfaces of the first connection unit 100 and the second connection unit 200 abut against each other after the power input terminals 9 are inserted into the high-voltage power output terminals 4.

In the present embodiment, as shown in FIG. 9, to provide high voltage for the X-ray tube through the high-voltage power supply, it is needed to coat the first connection unit 100 and the second connection unit 200 with enough silica gel and then insert the first connection unit 100 to the second connection unit 200, and then fasten the first fixing member and the second fixing member together by bolts or the like to extrude air therebetween. Since the second connection unit 200 is amounted in the X-ray tube and the first connection unit 100 is amounted in the high-voltage power supply, the high-voltage power supply is fixed with the X-ray tube while preventing unexpected discharge of the high-voltage power supply. When the high-voltage power supply or the X-ray tube fails to work, it is needed to remove the bolts on the first fixing member and the second fixing member, pull the second connection unit 200 out of the first connection unit 100 to realize separation of the high-voltage power supply and the X-ray tube, so as to facilitate the fault detection and maintenance of the high-voltage power supply or the X-ray tube respectively. Therefore, the high-voltage power supply and the X-ray tube are connected together in the aforementioned way, which not only reduces the installation space of the high-voltage power supply and the X-ray tube, but also facilitates the disassembly and maintenance when either of the high-voltage power supply and the X-ray tube fails.

It should be emphasized that each embodiment or variant of the present invention is described in a relevant manner, and the same similar parts between each embodiment or variant can be referred to each other, and each embodiment or variant focuses on the differences from other embodiments, but they are all realized based on the working principle of the above connection device.

The present invention also provides an X-ray source comprising the connection device. The X-ray source comprises a high-voltage power supply and an X-ray tube connected together with aforesaid connection device. The high-voltage power supply, the X-ray tube and the connection device could be individual pieces and be sold independently. Alternatively, the high-voltage power supply and the X-ray tube connected together with the connection device to form an integral X-ray source for sales. The structures of the high-voltage power supply and the X-ray tube, and the working principle of the X-ray source are conventional technologies, which will not be redundantly provided here.

In summary, the connection device of high-voltage power supply and X-ray tube provided by the present invention, by mounting the first connection unit and the second connection unit correspondingly to the high-voltage power supply and X-ray tube respectively, removably plugged together, can not only make the high-voltage power supply and X-ray tube connected together to realize the high-voltage power supply providing high-voltage to the X-ray tube; but also separate the high-voltage power supply and X-ray tube to realize the disassembly and maintenance when either of the high-voltage power supply and X-ray tube fails.

The connection device of the high-voltage power supply and the X-ray tube, and the corresponding X-ray source provided in the present invention are described above in detail. For a person of ordinary skill in the art, any obvious change made to the present invention without departing from the essential content of the present invention shall fall within the protection scope of the patent of the present invention.

What is claimed is:

1. A connection device of a high-voltage power supply and an X-ray tube, wherein the connection device comprises a first connection unit and a second connection unit, the first connection unit being configured to connect a high-voltage power output terminal of the high-voltage power supply and the second connection unit being configured to connect a cathode of the X-ray tube; wherein the first connection unit and the second connection unit are configured to be removably plugged together;

the first connection unit comprising:

a first flange of a high-voltage power supply housing, the first flange having a through hole;

a first housing made of non-metallic material, one end of the first housing being provided with a high-voltage power output terminal, the other end of the first housing being mated to an outer side of the first flange, wherein the first housing is configured to be embedded in the high-voltage power supply housing from the through hole of the first flange such that an end surface of the first housing is coplanar with an end surface of the first flange;

a first metal shielding ring surrounding the high-voltage power output terminal;

wherein a length of the first housing is configured such that a creepage distance from the high-voltage power output terminal to the first flange is at least 1 mm per 1 kV of an output voltage of the high-voltage power supply;

the second connection unit comprising:

a second flange of an X-ray tube housing, the second flange having a passage for accommodating an anode of an X-ray tube insert;

a second housing made of non-metallic material, one end of the second housing being provided with a power input terminal configured to connect to a cathode of the X-ray tube insert, the other end of the second housing being fixed to the second flange, wherein the second housing is configured to surround the X-ray tube insert;

a second metal shielding ring surrounding the power input terminal;

wherein a space between the first housing and the high-voltage power supply housing is filled with a first insulating filler, and a space between the second housing and the X-ray tube insert is filled with a second insulating filler; and wherein the second connection unit is configured to be coated with a silica gel and then inserted into the first connection unit, and the first flange and the second flange are configured to be fastened together to extrude air between the first connection unit and the second connection unit, thereby providing a removable connection between the high-voltage power supply and the X-ray tube.

2. The connection device of a high-voltage power supply and an X-ray tube according to claim 1, wherein the X-ray tube is placed in an internal cavity of the second connection unit.

3. The connection device of a high-voltage power supply and an X-ray tube according to claim 1, wherein end surfaces of the high-voltage power output terminals extend outside from an outer end surface of the first insulating filler, and end surfaces of the power input terminals are embedded in the second insulating filler and flush with an outer end surface of the second insulating filler.

4. The connection device of a high-voltage power supply and an X-ray tube according to claim 1, wherein end surfaces of the high-voltage power output terminals are embedded in the first insulating filler, and end surfaces of the power input terminals extend outside from the outer end surface of the second insulating filler.

5. An X-ray source comprises a high-voltage power supply and an X-ray source tube, wherein the high-voltage power supply and the X-ray tube are detachably connected together with the connection device of the high-voltage power supply and the X-ray tube according to claim 1.

* * * * *